United States Patent [19]
Gutjahr et al.

[11] 3,877,987
[45] Apr. 15, 1975

[54] METHOD OF MANUFACTURING POSITIVE NICKEL HYDROXIDE ELECTRODES

[75] Inventors: Manfred August Gutjahr, Wendlingen, Neckar, Germany; Rudolf Schmid, Perchtoldsdorf near Vienna, Austria; Klaus Dieter Beccu, Troinex, Geneve, Switzerland

[73] Assignee: Battelle Memorial Institute, Carouge, Geneve, Switzerland

[22] Filed: June 5, 1974

[21] Appl. No.: 476,723

[30] Foreign Application Priority Data
June 7, 1973   Switzerland........................ 8240/73

[52] U.S. Cl. ............................... 136/29; 204/180 R
[51] Int. Cl. ........................................... H01m 43/04
[58] Field of Search ............. 136/29, 28, 36, 37, 49, 136/67, 120 R, 120 FC; 75/200, 201, 208 R, 222, 224; 264/317; 29/191.2

[56]         References Cited
         UNITED STATES PATENTS

| | | | |
|---|---|---|---|
| 2,860,175 | 11/1958 | Justi.............................. | 136/120 FC |
| 3,186,871 | 6/1965 | Donohue ............................ | 136/29 |
| 3,336,134 | 8/1967 | Kulp et al.......................... | 75/201 X |
| 3,408,180 | 10/1968 | Winkler............................. | 75/222 X |
| 3,799,808 | 3/1974 | Hancock............................. | 136/29 |

*Primary Examiner*—John H. Mack
*Assistant Examiner*—C. F. Lefevour

[57]         ABSTRACT

Method of manufacturing a positive nickel hydroxide electrode. A highly porous core structure of organic material having a fibrous or reticular texture is provided with a double coating by successively spraying molten zinc and molten nickel so as to uniformly cover the surface of the core structure with a protective zinc coating and an overlying nickel coating. The resulting coated structure is then subjected to a thermal treatment so as to provide sintering of the nickel coating, removal of the organic core material and evaporation of the zinc of the protective coating. A consolidated, porous nickel support structure is thus produced which has substantially the same texture and porosity as the initial core structure. To provide the positive electrode including the active mass, nickel hydroxide is deposited in the pores of the nickel support structure.

7 Claims, No Drawings

METHOD OF MANUFACTURING POSITIVE NICKEL HYDROXIDE ELECTRODES

Positive electrodes with nickel hydroxide as the active mass arer used in various alkaline accumulators, e.g., of the Ni—Cd or Ni—Fe type. Nickel hydroxide provides particular advantages as the active mass due to its high reversibility, low self-discharge and its being substantially insoluble in alkaline electrolytes and hence having a long useful lifetime. This active mass moreover provides satisfactory positive discharge potentials and allows high charge and discharge rates due to a rapid redox reaction involving proton diffusion. Nickel hydroxide electrodes further provide high performance at low temperatures, as well as a satisfactory theoretical specific capacity per unit mass at a low cost of the active mass.

In view of these advantages of the active mass, nickel hydroxide electrodes are of particular interest for use in alkaline accumulators which have a high specific capacity and are required to provide high energy and power densities during discharge.

However, nickel hydroxide only has an insignificant electrical conductivity so that high current loads are only possible if the entire active mass is in intimate contact with a large surface of a good electronic conductor. To this end, sintered nickel plates having fine pores are generally provided as an electrode support.

Nickel hydroxide electrodes are generally used with such a porous nickel support, which is manufactured by sintering nickel powder on a perforated, nickel-plated steel band or steel netting, and the active nickel hydroxide mass is then introduced into the pores of the sintered nickel structure by repeatedly applying a chemical precipitation process.

However, the porosity of such electrode support structures made of sintered nickel powder is limited due to the necessity of ensuring satisfactory mechanical stability, and the proportion by weight of the sintered nickel powder structure in the electrode is relatively high. Moreover, even when the manufacturing conditions are carefully controlled, and the various operations of the chemical impregnation process are repeated several times, it is only possible to fill the available pore volume of the sintered support to a limited extent.

The useful specific capacity per unit weight of the whole electrode is thus quite limited and amounts at most to about 40% of the theoretically calculated value based on the active mass.

In addition, the high expense which must be incurred to ensure precisely controlled manufacturing conditions, high investment costs for the sintering and impregnating installations, as well as high material cost of the supporting structure, lead to a high cost of these known nickel hydroxide electrodes with sintered nickel supports.

These known electrodes thus have various drawbacks and limitations which are inherent in their structure and mode of manufacture.

In order to reduce the electrode weight, it has been proposed to manufacture the support structure by sintering nickel fibers together. Although this provides a certain weight reduction, it entails a substantial cost increase as the manufacture of nickel fibers is particularly expensive.

It has further been proposed to manufacture nickel support structures by first chemically or galvanically coating a porous core structure (fabric, fiber felt or foam) of organic material or carbon with nickel, and then subjecting the coated structure to a thermal treatment serving to remove the core material. This enables lighter supporting structures to be obtained for nickel hydroxide electrodes. However, the manufacturing methods proposed for such electrodes entail high cost and much time, whereby these drawbacks constitute an important obstacle to manufacture on a large scale and hence extensive application of such supporting structures to nickel hydroxide electrodes.

The present invention is designed to largely obviate the mentioned drawbacks and limitations so as to allow the above-mentioned advantages of utilizing nickel hydroxide as a positive active mass to be more fully exploited in order to achieve a high specific capacity while ensuring satisfactory performance at high current densities in alkaline accumulators.

An object of the invention is thus to provide improved nickel hydroxide electrodes while largely obviating the said drawbacks and providing a simplified method of manufacturing such electrodes.

The invention relates to a method of manufacturing a positive nickel hydroxide electrode for galvanic cells. This method comprises the steps of providing a highly porous core structure of organic material with a fibrous or reticular texture having a large surface with a double coating by successively spraying molten zinc and nickel onto the said core structure so as to cover said structure uniformly first with a protective coating of zinc and then with an outer coating of nickel, while substantially retaining the initial texture and porosity of said core structure, subjecting the resulting coated structure to a thermal treatment which provides sintering of the said nickel coating, removal of the organic core material and evaporation of the zinc, so as to thereby produce a strongly consolidated highly porous support structure consisting substantially of nickel, and having a texture and porosity corresponding substantially to the initial core structure, and depositing the nickel hydroxide mass in the pores of the said support structure.

This method allows the manufacture, in a very simple manner, of an electrically highly conductive, mechanically stable, porous nickel support structure having a large internal surface, high porosity with optimum pore-size distribution and structure, and low specific weight per unit volume.

Any appropriate commercially available material may be selected for the core structure, e.g., a felt or non-woven material consisting of natural or synthetic fibers, or a reticular plastics foam, in order to ensure an optimum pore distribution in the resulting support structure.

It may thus be noted that a broad variety of porous organic core structures may be utilized when carrying out the method according to the invention. The said felt or non-woven materials may consist of cellulose fibers for example, or of various plastics fibers, e.g., of polyacrylonitrile, polyester, polyamide, or polypropylene. One may moreover use various organic foams having an open-cell structure, e.g., synthetic foams based on polyester, polyether or polyurethane, for the core structure.

The porosity of the resulting metallic support structure may be made to attain up to 99% by suitably selecting the organic core structure.

Coating of the organic core structure can moreover be readily ensured very rapidly and reproducibly by using known flame-spraying or air-spraying techniques. The zinc coating which is applied at a relatively low temperature protects the core structure from thermal decomposition during the coating with nickel which is subsequently effected at a higher temperature.

The thermal treatment of the metallized core structure can likewise be readily effected rapidly and reproducibly by utilizing relatively simple technical means. Removal of the organic core material and evaporation of the zinc coating material, which are both achieved by this thermal treatment, further provide an additional increase of the porosity of the resulting support structure and a corresponding reduction of its specific weight.

In order to provide for a desired electrode thickness as well as plane surfaces on either side thereof, the metal coated structure may be arranged during the thermal treatment between two plates provided with corresponding spacers (e.g., of ceramic material). During this treatment, the core structure is then pressed together under the weight of the upper plate to a desired thickness which is predetermined by the height of the spacers. This further enables control of the pore size as well as the pore structure.

The technical requirements may thus be readily fulfilled with regard to mechanical strength as well as electrical conductivity of the electrode support obtained in this manner. At the same time, an electrode support with a fibrous or reticular metallic structure can be readily obtained which has a particularly large inner surface and can have a porosity of about 95% or even more. Such a support structure moreover facilitates quite considerably the subsequent introduction of the nickel hydroxide into the pores thereof.

It may thus be noted that the special advantages of the support structure provided for in accordance with the invention and in particular its high porosity, favourable pore distribution and pore structure, provide a considerably enhanced accessibility to the entire inner surface of the structure and hence facilitate quite substantially the incorporation of the active mass within the electrode support structure. Fibrous structures present various advantages especially with regard to satisfactory metallization and introduction of the active mass, as well as to enabling the finished electrode to provide discharge at high current densities.

The important advantages mentioned above moreover apply with various modes of introducing or forming the nickel hydroxide in the pores of the support structure. Thus, for example, it is possible to achieve satisfactory impregnation of the structure with nickel hydroxide with quite simple mechanical means. To this end, freshly precipitated nickel hydroxide in the form of a suspension may be brought into contact with the support structure which is used as a filter element in a suitable arrangement. The pores may thus be filled substantially with nickel hydroxide by simple mechanical means which may include vibrators, ultrasound generators or means for applying reduced pressure to one side of the support structure or high pressure to the impregnating liquid. It has been found that, after effecting mechanical deposition of the active mass, electrical contact between the support structure and the active mass may be enhanced by further carrying out a chemical impregnation of the structure with a melt of nickel nitrate or with concentrated solutions of other nickel salts such as nickel sulphate or nickel chloride and then converting the nickel salt into nickelhydroxide by immersing the impregnated structure in an alkali hydroxide.

The active mass may also be introduced into the support by electrophoresis, e.g., by subjecting a suspension of nickel hydroxide in nitromethane to electrophoresis at a potential difference of 300 V and by further applying ultra-sound to provide better penetration of the active mass into the pores of the support structure.

Also in that case it is advantageous to further effect an additional chemical impregnation in order to improve the contact between the active mass and the support and to thereby ensure improved utilization of the active mass.

Due to the above mentioned advantages of the electrode support, it is possible to readily and reproducibly incorporate a maximum amount of active mass in the electrode obtained in accordance with the invention while at the same time ensuring intimate contact over a large surface between the active mass and the electrode support. Whichever impregnating process may be used, it is in all cases advantageous to add lithium salts or lithium hydroxide to the impregnating mass in order to enhance the electronic conductivity of the active mass. The amount of lithium thus added should preferably be about 0.5 – 1% by weight of the active mass.

The present invention now allows a considerable reduction of the manufacturing and material costs and hence of the electrode price to be achieved, while readily ensuring a high proportion of the active mass and good utilization thereof in the electrode.

The following examples serve to further explain the method according to the present invention.

EXAMPLE 1

A highly porous nickel support structure having a fibrous texture with a large surface is first made by using as a model a core structure in the form of a band of non-woven cellulose fibers which has a thickness of 1.4 mm and a porosity greater than 95%, the fiber thickness being about 10 $\mu$.

This non-woven cellulose fiber band is first provided with a zinc coating by flame-spraying, by passing the band between two flame-spray pistols from which molten zinc is sprayed onto both sides of the band in a total amount of 8 gr of zinc per $dm^2$ of the band so as to form a zinc coating which uniformly covers all the cellulose fibers of the band.

The zinc-coated band is next provided with a nickel coating, also by flame-spraying, by passing it between two flame-spray pistols from which molten nickel is sprayed onto the band, i.e., onto the zinc coating thereof, in a total amount of 10 gr of nickel per $dm^2$ of the band so as to form a nickel coating which uniformly covers the zinc coating on the fibers of the band.

The band of non-woven cellulose fibers which are thus twice metallized is now subjected to a thermal treatment wherein it is first heated during 5 minutes to 700°C in a stream of air and then heated during 20 minutes to 980°C in a protective gas atmosphere (mixture of 7% hydrogen, 93% argon, saturated at 25°C with $H_2O$ vapour). This atmosphere is so selected that it permits oxidation of the material of the core structure for removal thereof, while acting as a protective gas which prevents oxidation of the nickel.

This thermal treatment provides pyrolysis and combustion of the cellulose, the combustion products being removed by the gas stream, while sintering of the nickel coating occurs at the points of intersection of neighbouring fibers and the zinc is substantially evaporated of any nickel oxide which is present being reduced to metallic nickel.

After coating, a support structure is obtained in the form of a highly cohesive band consisting essentially of nickel and having a thickness of about 1.2 mm, a fibrous texture with a porosity of about 85 to 95% and a weight of about 12 gr/dm$^2$.

The nickel hydroxide active mass of the electrode is finally incorporated in this support structure by applying a known chemical impregnation process, wherein: the structure is immersed briefly in a concentrated solution (or melt) of $Ni(NO_3)_2.6 H_2O$ at 90°C, dried at 90°C in air, then immersed in a 6 N KOH-solution at 90°C during about 10 minutes, and finally rinsed with water to remove the alakli.

These steps are repeated several times so as to substantially fill the pores of the support structure with $Ni(OH)_2$.

The nickel hydroxide electrode which is thus obtained is particularly well suited for use as a positive electrode in an alkaline accumulator.

Cycling tests with this electrode with discharge in 5 hours in 6N KOH, in a half-cell arrangement with a Hg/HgO reference electrode provides a specific capacity of 118 Ah per kg of the total electrode weight.

EXAMPLE 2

A highly porous nickel support with a reticular structure is manufactured, starting from a core structure in the form of a reticular polyether foam plate with a thickness of 4 mm and a porosity greater than 95%.

This core structure is metallized by flame-spraying as described in Example 1 so that the reticular foam structure is uniformly covered with a zinc coating and with an overlying nickel coating.

The resulting metallized foam is now heated during 40 minutes at 1,050°C in a hydrogen atmosphere which has been saturated at 25°C with $H_2O$-vapour. This thermal treatment provides sintering of the nickel coating on the reticular structure, removal of the organic foam material and evaporation of the zinc.

After cooling, a highly cohesive reticular support structure consisting substantially of nickel is obtained which has a thickness of about 2.5 mm, a porosity of about 90 to 95% and a weight of about 15 gr/dm$^2$.

Nickel hydroxide is finally deposited electrochemically, in the pores of the resulting support structure which is polarized cathodically in an electrolysis bath consisting of an aqueous solution comprising 200 gr of nickel nitrate with an addition of 20 gr of nickel hydroxide per liter of water. Due to this addition, the electrolysis bath is kept at pH 5–7, while precipitation of $Ni(OH)_2$ occurs in the pores of the support structure due to a slight electrolytically caused pH shift.

The resulting nickel hydroxide electrode is likewise well suited for use in an alkaline accumulator and provides a similar capacity to that of the electrode of Example 1.

EXAMPLE 3

A fibrous nickel support structure is produced as in Example 1, and then placed on a porous glass plate having the bottom side thereof in communication with a container kept under a vacuum of 2 mm Hg. A suspension of nickel hydroxide in alkali hydroxide solution is then prepared by providing an aqueous solution of nickel sulphate with an excess of caustic soda. The resulting suspension is poured onto the support structure to form thereon a layer with a height of about 3 cm, whereby the support structure acts as a filter plate. A vibrator electrode is then arranged in the suspension layer, parallel to the support structure and connected to an ultra-sound generator having a power of 100 W and a frequency of 18,000 Hz. By applying the vacuum and simultaneously operating this generator, the nickel hydroxide suspension is rapidly brought into the pores of the fibrous nickel support structure, so that the electrode support is filled in a few minutes with a large amount of mass, namely 70% by weight of the electrode. The excess hydroxide is then removed from the surface and the electrode is further immersed in a melt of nickel nitrate as described in Example 1 and, after drying, treated in 6N caustic potash. After watering and drying the electrode is ready for use in an alkaline accumulator. Electrochemical cycling of the electrode in a half-cell provides a capacity of 150 Ah/kg.

What we claim is:

1. A method of manufacturing a positive nickel hydroxide electrode for galvanic cells comprising the steps of providing a highly porous core structure of organic material with a fibrous or reticular texture having a large surface with a double coating by successively spraying molten zinc and nickel onto the said core structure so as to cover said structure uniformly first with a protective coating of zinc and then with an outer coating of nickel, while substantially retaining the initial texture and porosity of said core structure, subjecting the resulting coated structure to a thermal treatment which provides sintering of the said nickel coating, removal of the organic core material and evaporation of the zinc, so as to thereby produce a strongly consolidated highly porous support structure consisting substantially of nickel, and having a texture and porosity corresponding substantially to the initial core structure, and depositing the nickel hydroxide mass in the pores of the said support structure.

2. The method according to claim 1, wherein the thermal treatment is carried out in two consecutive steps, whereby the metallized core structure is first briefly heated in air to a temperature above 700°C in a first step, so that the organic core material undergoes pyrolysis and combustion, and is thereafter heated in a second step in a reducing atmosphere to a temperature of about 950°C, so as to evaporate the zinc of the protective coating whereby to provide the coherent electrode structure of metallic nickel.

3. The method according to claim 1, wherein the active mass is deposited electrochemically in the pores of the support structure by subjecting said structure to cathodic polarization in a nickel nitrate bath with a pH value of 5 to 7.

4. The method according to claim 1, wherein the active mass is formed in the pores of the support structure by impregnation thereof with a nickel salt solution, drying and treatment thereof with an alkaline solution, so that the nickel salt is converted into nickel hydroxide.

5. The method according to claim 1, wherein nickel hydroxide particles in suspension are introduced and deposited in the pores of the support structure by filtering.

6. The method according to claim 5, wherein nickel hydroxide in suspension is introduced into the pores of the support structure while applying ultra-sound.

7. The method according to claim 1, wherein nickel hydroxide is introduced into the pores of the support structure by electrophoresis.

* * * * *